(12) United States Patent
Malisetti et al.

(10) Patent No.: US 8,516,295 B2
(45) Date of Patent: Aug. 20, 2013

(54) SYSTEM AND METHOD OF COLLECTING AND REPORTING EXCEPTIONS ASSOCIATED WITH INFORMATION TECHNOLOGY SERVICES

(75) Inventors: Ramanjaneyulu Malisetti, Ranga Reddy (IN); Vamshi Shekhar Chandramukhi, Hyderabad (IN)

(73) Assignee: CA, Inc., Islandia, NY (US)

( * ) Notice: Subject to any disclaimer, the term of this patent is extended or adjusted under 35 U.S.C. 154(b) by 0 days.

(21) Appl. No.: 12/729,363

(22) Filed: Mar. 23, 2010

(65) Prior Publication Data

US 2011/0239050 A1 Sep. 29, 2011

(51) Int. Cl.
*G06F 11/00* (2006.01)
(52) U.S. Cl.
USPC .......................................................... 714/4.1
(58) Field of Classification Search
None
See application file for complete search history.

(56) References Cited

U.S. PATENT DOCUMENTS

| | | | | |
|---|---|---|---|---|
| 6,742,134 | B1* | 5/2004 | Pothier et al. | 714/4.12 |
| 6,862,690 | B1* | 3/2005 | Bezera et al. | 714/4.1 |
| 7,197,561 | B1* | 3/2007 | Lovy et al. | 709/224 |
| 7,246,254 | B2* | 7/2007 | Alur et al. | 714/2 |
| 2003/0056140 | A1* | 3/2003 | Taylor et al. | 714/4 |
| 2006/0048017 | A1* | 3/2006 | Anerousis et al. | 714/47 |
| 2009/0300430 | A1* | 12/2009 | Nissan-Messing et al. | 714/48 |
| 2010/0162036 | A1* | 6/2010 | Linden et al. | 714/4 |
| 2011/0041126 | A1* | 2/2011 | Levy et al. | 718/1 |

* cited by examiner

*Primary Examiner* — Michael Maskulinski
(74) *Attorney, Agent, or Firm* — Baker Botts, LLP

(57) ABSTRACT

According to one embodiment of the present disclosure, a method of collecting and reporting exceptions associated with information technology services includes receiving exceptions associated with a service, including receiving exceptions associated with an infrastructure and exceptions associated with an application; formatting the exceptions into an exceptions list; correlating at least one of the exceptions associated with the infrastructure and at least one of the exceptions associated with the application to identify a service error condition; and storing the exceptions list and an identifier of the service error condition for presentation to a client associated with the service.

24 Claims, 4 Drawing Sheets

SYSTEM AND METHOD OF COLLECTING AND REPORTING EXCEPTIONS ASSOCIATED WITH INFORMATION TECHNOLOGY SERVICES

TECHNICAL FIELD OF THE PRESENT DISCLOSURE

The present disclosure relates generally to information technology services, and, more particularly, to a system and method of collecting and reporting exceptions associated with information technology services.

BACKGROUND OF THE PRESENT DISCLOSURE

Over time, business entities have increasingly utilized information technology solutions to increase the capacity and efficiency of their business processes. As the number and complexity of information technology solutions have increased, so to has the use of the Internet. Accordingly, business entities are increasingly looking toward Internet-delivered information technology solutions to meet their information technology needs. These Internet-delivered information technology solutions, however, have challenges in various respects.

SUMMARY OF THE PRESENT DISCLOSURE

In accordance with the present disclosure, techniques for collecting and reporting exceptions associated with information technology services are provided. According to various embodiments, these techniques can substantially eliminate challenges and problems associated with Internet-delivered information technology solutions.

According to one embodiment of the present disclosure, a method of collecting and reporting exceptions associated with information technology services includes receiving exceptions associated with a service, including receiving exceptions associated with an infrastructure and exceptions associated with an application; formatting the exceptions into an exceptions list; correlating at least one of the exceptions associated with the infrastructure and at least one of the exceptions associated with the application to identify a service error condition; and storing the exceptions list and an identifier of the service error condition for presentation to a client associated with the service.

According to another embodiment, a system for collecting and reporting exceptions associated with information technology services includes an interface that receives exceptions associated with a service, including exceptions associated with an infrastructure and exceptions associated with an application. Additionally, the system includes a processor that formats the exceptions into an exceptions list; correlates the exceptions associated with the infrastructure and the exceptions associated with the application to identify a service error condition; and stores the exceptions list and an identifier of the service error condition for presentation to a client associated with the service.

Embodiments of the present disclosure may provide a number of technical advantages. For example, a technical advantage may include the ability to collect and report exceptions associated with information technology services. Another technical advantage may include facilitating the dissemination of service information to a client at or near the time that events occur within the information technology services. Transparency and assurance may be provided to clients by providing clients with information regarding the status of their information technology services. A benefit may include the early detection of warnings and problems associated with the information technology services. Another benefit may include the ability to proactively obtain information about the information technology services and initiate a remedial plan based on the identification of an error condition. In addition, information regarding information technology services may provide the ability to determine causes of error conditions associated with the information technology services. Similarly, future error conditions associated with the information technology service may be predicted by mining historic data. Another technical advantage may include the ability to report service exceptions and error conditions to a client associated with that service in a convenient format and manner. Furthermore, a benefit may include the ability to keep clients informed about the health of cloud-based services that are providing information technology services. In addition, information regarding services may enable clients to determine how well cloud-based services and cloud-based service providers are meeting information technology needs. Still another benefit may include aggregating information regarding exceptions from independent hardware and software modules within cloud-based services and on-premise sources.

While specific advantages have been enumerated above, various embodiments may include, all, some, or none of the enumerated advantages. Additionally, other technical advantages may become readily apparent to one of ordinary skill in the art after review of the following figures, description, and claims.

BRIEF DESCRIPTION OF THE DRAWINGS

To provide a more complete understanding of the present disclosure and its advantages, reference is made to the accompanying drawings, in which like reference numbers indicate like features, and wherein.

DETAILED DESCRIPTION OF THE PRESENT DISCLOSURE

Figure 1:
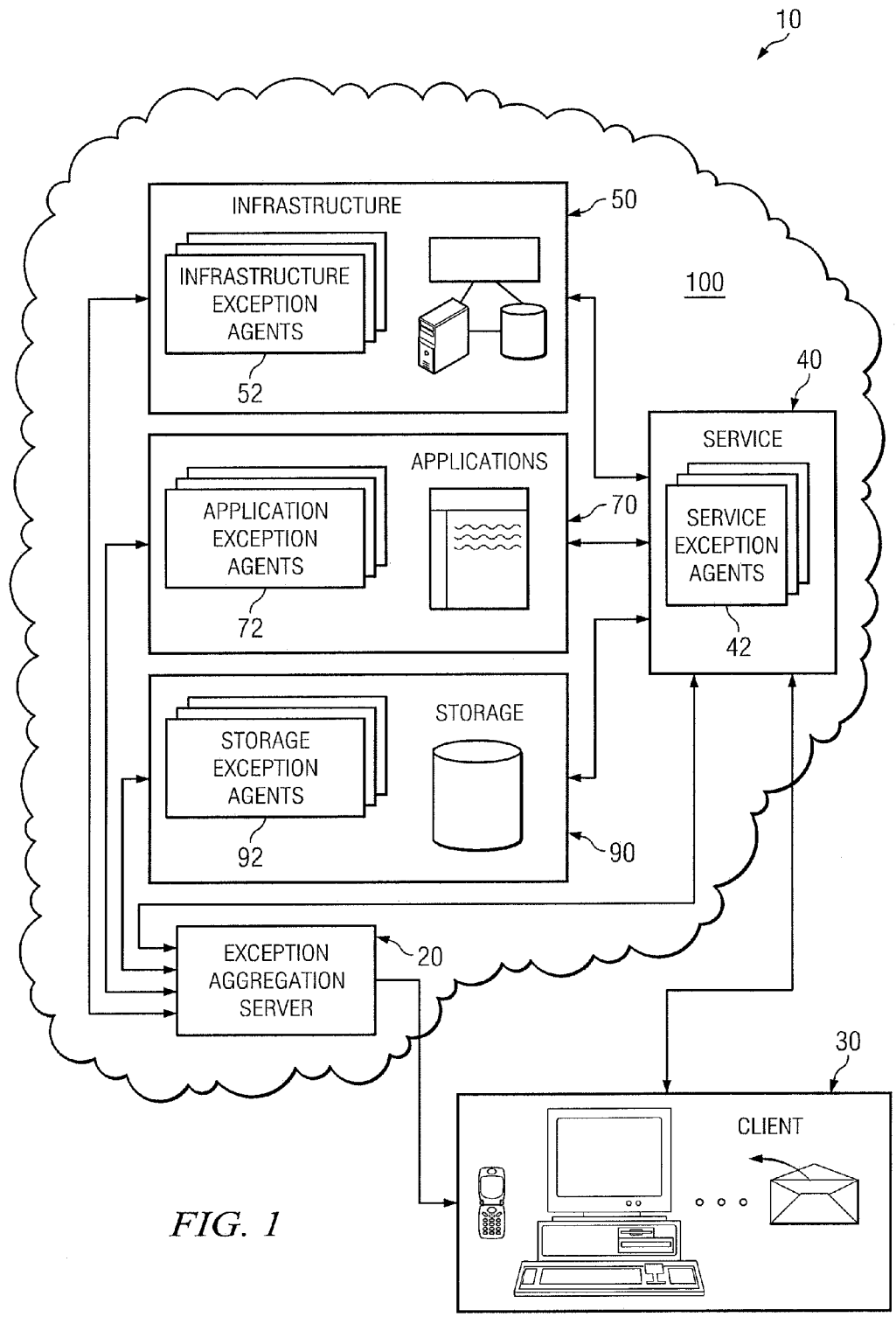
FIG. 1 is a block diagram illustrating an example embodiment of a system for collecting and reporting exceptions associated with information technology services.

FIG. 1 illustrates a system, indicated generally at 10, that includes an exception aggregation server 20, a client 30, a service 40, an infrastructure 50, applications 70, a storage 90, and a communication network 100. System 10 also includes service exception agents 42, infrastructure exception agents 52, application exception agents 72, and storage exception agents 92. According to various embodiments, exception aggregation server 20 collects exceptions associated with service 40 for presentation to client 30. For example, exception aggregation server 20 may collect exceptions associated with services 40, infrastructure 50, applications 70, and storage 90 by receiving information from service exception agents 42, infrastructure exception agents 52, application exception agents 72, and/or storage exception agents 92 through communication network 100. Exception aggregation server 20 may analyze the information and present the information and/or an analysis to client 30.

Exception aggregation server 20 represents any suitable collection of hardware, software, and controlling logic capable of collecting exceptions associated with service 40 and reporting exceptions to client 30 through communication network 100. For example, exception aggregation server 20 may collect exceptions associated with all, some, or one of service 40, infrastructure 50, applications 70, and storage 90. An exception may include any information associated with service 40, infrastructure 50, applications 70, and/or storage 90. For example, an exception may include a warning, error, status update, or other information concerning the operation of elements within system 10. Sources of exceptions may include various hardware modules, software modules, and/or other elements associated with system 10. In the alternative or in addition, exceptions may provide instructions regarding one or more remedial actions that may be taken in response to an exception. In various embodiments, exception aggregation server 20 represents any suitable collection of hardware, software, and controlling logic capable of formatting exceptions and/or analyzing information associated with exceptions. In the alternative or in addition, exception aggregation server 20 represents any suitable collection of hardware, software, and controlling logic able to store exceptions and/or analysis information associated with exceptions. According to various embodiments, exception aggregation server 20 includes a web server application capable of presenting and receiving information through communication network 100 using one or more web pages and/or providing client 30 information to use in a dashboard display. In various embodiments exception aggregation server 20 may represent logic encoded in media. For example, exception aggregation server 20 may be installed on one or more hardware modules and/or in software modules associated with system 10. Thus, logic encoded in media may comprise software, hardware, instructions, code, logic, and/or programming encoded and/or embedded in one or more computer-readable media, such as volatile and non-volatile memory modules, hard disks, optical drives, flash drives, CD-Rs, CD-RWs, and DVDs. While represented as a single entity, it should be understood that exception aggregation server 20 may represent multiple entities capable of collecting and reporting exceptions associated with information technology services.

Client 30 represents an entity such as a person, a group of persons, and/or any appropriate hardware, software, and controlling logic capable of requesting and/or receiving exceptions associated with exception aggregation server 20 through communication network 100. In various embodiments, client 30 may include traditional telephones, pagers, personal computers, email accounts, personal digital assistants (PDAs), web browsers, or any other device capable of communicating with exception aggregation server 20 through communication network 100. In various embodiments, client 30 may include web browsers capable of accessing one or more web pages and/or receiving information to populate a dashboard display that can display exceptions and other information received from exception aggregation server 20. Alternatively or in addition, client 30 may include a local display device capable of receiving reports from an interface associated with exception aggregation server 20. While represented as a single entity, it should be understood that client 30 may represent multiple entities taking advantage of various services, and that exception aggregation server 20 may be capable of reporting client-specific exceptions to these clients using a variety of presentation methods and display devices.

Service 40 represents any suitable collection of hardware, software, and controlling logic capable of providing information technology services to client 30 through communication network 100. Information technology services may include cloud-based services, Internet-delivered services, services delivered over Intranets, services delivered over non-Internet-based networks, and/or services delivered using any combination of these networks. Service 40 may include all, some, or one of infrastructure 50, applications 70, and storage 90. Thus, service 40 may represent a comprehensive cloud-based service delivered as a package service to client 30 based on cloud-based information technology needs. Alternatively or in addition, service 40 may represent various elements or services delivered to client 30 through communication network 100 based on cloud-based information technology needs. Alternatively or in addition, service 40 may represent any suitable collection of hardware, software, and controlling logic capable of governing and/or tracking use of cloud-based services that comprise service 40. Use may be designated by one or more of a variable amount of time, utilization level, capacity, or other appropriate metric. It should be understood that while service 40 is presented here as a single service presented to a single client 30, service 40 may, in various embodiments, represent multiple cloud-based services presented to multiple clients. Service 40 may additionally or alternatively represent multiple cloud-based services from one or more of various cloud-service providers and/or cloud-service vendors. In the alternative or in addition, information technology services may include premises-based services. Thus, service 40 may represent any combination of on-premise information technology infrastructure, on-premise applications, and/or on-premises storage.

Service exception agents 42 represent any suitable collection of hardware, software, and controlling logic capable of collecting exceptions associated with service 40 and reporting exceptions to exception aggregation server 20 through communication network 100. In various embodiments, service exception agents 42 represent multiple exception agents. Each of the service exception agents 42 may be associated with one or more hardware modules and/or software modules within service 40. According to various embodiments, service exception agents 42 include one or more web servers capable of presenting and receiving information through communication network 100 using one or more web pages. In various embodiments service exception agents 42 may represent logic encoded in media. For example, exception agents 42 may be installed on one or more hardware modules and/or in software modules associated with service 40.

Infrastructure 50 represents any suitable collection of hardware, software, and controlling logic operable to provide infrastructure resources to client 30 through service 40 and/or communication network 100. Infrastructure resources may include network resources such as all or a portion of telecommunication networks, satellite networks, cable networks, local area networks (LANs), wireline or wireless networks, wide area networks (WANs), the Internet, and/or any other appropriate networks. Thus, network resources may include any combination of network devices such as switches, routers, hubs, bridges, and wireless access points that may be desirable as all or a portion of an infrastructure service. In the alternative or in addition, infrastructure resources may include computing resources such as servers, storage, clients, computers, logic, applications, appliances, hardware, software, applications, grid-based or high performance clusters, and/or any other appropriate computing elements and devices that may be desirable as all or a portion of an infrastructure service. Infrastructure resources may include storage resources such as directly attached storage (DAS) devices, storage area networks (SANs), SAN devices, tape back-up devices, virtual and real storage controllers, hard disks, volatile and non-volatile memory, management servers, hardware, software, and/or any other appropriate storage elements and devices that may be desirable as all or a portion of an infrastructure service. Various infrastructure resources may be packaged as all or a portion of infrastructure 50 to deliver services to client 30 through communication network 100 based on cloud-based information technology needs. Alternatively or in addition, infrastructure 50 may represent any suitable collection of hardware, software, and controlling logic capable of governing and/or tracking use of infrastructure resources that comprise infrastructure 50. Use of infrastructure 50 may be designated by one or more of a variable amount of time, utilization level, capacity, or other appropriate metric. While represented as a single service, it should be understood that infrastructure 50 may represent multiple services capable of providing cloud-based infrastructure resources. Furthermore, it should additionally be understood that infrastructure 50 may represent any combination of on-premise information technology sources, on-premise applications that host services, and/or cloud-based services. Infrastructure 50 may additionally or alternatively represent multiple cloud-based services from one or more of various cloud-service providers and/or cloud-service vendors.

Infrastructure exception agents 52 represent any suitable collection of hardware, software, and controlling logic capable of collecting exceptions associated with infrastructure 50 and reporting exceptions to exception aggregation server 20 through communication network 100. In various embodiments, infrastructure exception agents 52 represent multiple exception agents. According to various embodiments, infrastructure exception agents 52 include one or more web servers capable of presenting and receiving information through communication network 100 using one or more web pages. In various embodiments infrastructure exception agents 52 may represent logic encoded in media. For example, infrastructure exception agents 52 may be installed on one or more hardware modules and/or in software modules associated with infrastructure 50.

Applications 70 represent any suitable collection of hardware, software, and controlling logic operable to provide application resources to client 30 through service 40 and/or communication network 100. Application resources may include all or a portion of various applications such as information technology management software, business applications, enterprise resource management programs (ERPs), customer relationship managers (CRMs), and/or industry-specific applications such as banking and/or finance software packages and other application elements and devices that may be desirable as all or a portion of an application. In various embodiments, all, some, or one of various application resources may be packaged as applications 70 to deliver services to client 30 through communication network 100 based on cloud-based technology needs. Alternatively or in addition, applications 70 may represent any suitable collection of hardware, software, and controlling logic capable of governing and/or tracking use of application resources that comprise applications 70. Use of applications 70 may be designated by one or more of a variable amount of time, utilization level, capacity, or other appropriate metric. While represented as a single service, it should be understood that applications 70 may represent multiple services capable of providing cloud-based application resources. Furthermore, it should additionally be understood that applications 70 may represent any combination of on-premise information technology sources, on-premise applications that host services, and/or cloud-based services. Applications 70 may additionally or alternatively represent multiple cloud-based services from one or more of various cloud-service providers and/or cloud-service vendors.

Application exception agents 72 represent any suitable collection of hardware, software, and controlling logic capable of collecting exceptions associated with applications 70 and reporting exceptions to exception aggregation server 20 through communication network 100. In various embodiments, application exception agents 70 represent multiple exception agents. According to various embodiments, application exception agents 72 include one or more web servers capable of presenting and receiving information through communication network 100 using one or more web pages. In various embodiments application exception agents 72 may represent logic encoded in media. Thus, application exception agents 72 may be installed on one or more hardware modules and/or in software modules associated with applications 70.

Storage 90 represents any suitable collection of hardware, software, and controlling logic operable to provide storage resources to client 30 through service 40 and/or communication network 100. Storage resources may include all or a portion of various storage elements such as DAS devices, SANs, SAN devices, tape back-up devices, virtual and real storage controllers, hard disks, volatile and non-volatile memory, management servers, hardware, software, and/or any other appropriate storage elements and devices that may be desirable as all or a portion of a storage service. In various embodiments, all, some, or one of various storage resources may be packaged as storage 90 to deliver to client 30 through communication network 100 based on cloud-based technology needs. Alternatively or in addition, storage 90 may represent any suitable collection of hardware, software, and controlling logic capable of governing and/or tracking use of storage resources that comprise storage 90. Use of storage 90 may be designated by one or more of a variable amount of time, utilization level, capacity, or other appropriate metric. While represented as a single service, it should be understood that storage 90 may represent multiple services capable of providing cloud-based storage resources. Furthermore, it should additionally be understood that storage 90 may represent any combination of on-premise information technology sources, on-premise applications that host services, and/or cloud-based services. Storage 90 may additionally or alternatively represent multiple cloud-based services from one or more of various cloud-service providers and/or cloud-service vendors.

Storage exception agents 92 represent any suitable collection of hardware, software, and controlling logic capable of collecting exceptions associated with storage 90 and reporting exceptions to exception aggregation server 20 through communication network 100. In various embodiments, storage exception agents 92 represent multiple exception agents. According to various embodiments, storage exception agents 92 include one or more web servers capable of presenting and receiving information through communication network 100 using one or more web pages. In various embodiments storage exception agents 92 may represent logic encoded in media. Thus, storage exception agents 92 may be installed on one or more hardware modules and/or in software modules associated with storage 90.

Communication network 100 represents any suitable collection of hardware, software, and controlling logic to interconnect elements coupled to system 10. Thus, communication network 100 provides an infrastructure to support communications within system 10. In various embodiments, communication network 100 may include one or more networks, such as a telecommunication network, a satellite network, a cable network, a local area network (LAN), a wireline or wireless network, a wide area network (WAN), the Internet, and/or any other appropriate networks. Thus, communication network 100 may include any combination of appropriate network devices, such as switches, routers, hubs, bridges, and wireless access points.

In operation, service 40 provides information technology solutions, including all or a portion of infrastructure 50, applications 70, and storage 90, to client 30 through communication network 100. Exception aggregation server 20 collects exceptions associated with service 40 for presentation to client 30. For example, exception aggregation server 20 may collect exceptions associated with all, some, or one of service 40, infrastructure 50, application 70, and storage 90 by receiving information from one or more of service exception agents 42, infrastructure exception agents 52, applications exception agents 72, and storage exception agents 92. Exception aggregation server 20 may analyze the information and present the information and/or an analysis to client 30.

Service exception agents 42 collect exceptions associated with the service 40 and transmit those exceptions to exception aggregation server 20 through communication network 100. Likewise, infrastructure exception agents 52 collect exceptions associated with the infrastructure 50 and transmit those exceptions to exception aggregation server 20 through communication network 100. Similarly, application exception agent 72 collect exceptions associated with applications 70 and transmit those exceptions to exception aggregation server 20 through communication network 100. In a similar way, infrastructure agents 92 collect exceptions associated with storage 90 and transmit those exceptions to exception aggregation server 20 through communication network 100.

The various exception agents 42, 52, 72, and 92 may be configured to operate in one or more collection modes. For example, exception agents 42, 52, 72, and 92 may collect exceptions in an intercept mode and/or a monitor mode. In the alternative or in addition, the various exception agents 42, 52, 72, and 92 may be configured to operate in a continuous mode whereby one of exception agents 42, 52, 72, and 92 continuously attempts to collect exceptions associated with one or more exception sources and report exceptions to exception aggregation server 20. It should be noted that, while a single exception aggregation server 20 has been described in reference to the drawings, the various exception agents may, in various embodiments, be configured to report exceptions to a multitude of exception aggregation servers 20 through communications network 100.

Exception aggregation server 20 may collect exceptions by receiving information from service agents 42, infrastructure exception agents 52, application exception agents 72, and storage exception agents 92 through communication network 100. Exception aggregation server 20 may analyze the information and present the information and/or an analysis to client 30. For example, exception aggregation server 20 may format exceptions into one or more exceptions lists based on one or more presentation and/or storage formats. In various embodiments, exception aggregation server 20 analyzes the exception information for redundancies and removes and/or omits redundancies from exceptions lists.

Exception aggregation server 20 may correlate exceptions to identify one or more service error conditions, such as errors, warnings, failures, health information, client usage metrics, and other relevant information associated with service 40. Additionally or alternatively, exception aggregation server 20 may classify exceptions and/or service error conditions by priority. For example, exception aggregation server 20 may determine the priority of a service error condition based on its relative importance to the overall health of service 40. Such classifications may include high, medium, and low priority conditions, and/or other appropriate classifications suitable to indicate their relative importance. In some embodiments exception aggregation server 20 creates one or more service condition identifiers based on the identification of service error conditions.

In various embodiments exception aggregation server 20 may store formatted exceptions, exceptions lists, and/or service condition identifiers for presentation to client 30 through communications network 100. Thus, exception aggregation server 20 may present formatted exceptions and service condition identifiers to client 30 through communication network 100. For example, exception aggregation server 20 may present information to client 30 based on receiving a selected preferred presentation method from client 30. Additionally or in the alternatively, exception aggregation server 20 may determine that a service condition has a high priority and may present information to client 30 at or near the time the condition is identified.

Thus, system 10 enables the collection and reporting of exceptions associated with information technology services. System 10 may provide the ability to determine the cause of error conditions associated with the information technology service and report service exceptions and service error conditions to a client associated with that service in a convenient format and manner. Additionally, system 10 may facilitate the dissemination of service information to a client at or near the time events occur and/or may provide transparency and assurance to clients that their information technology solutions are running and healthy.

Figure 2:
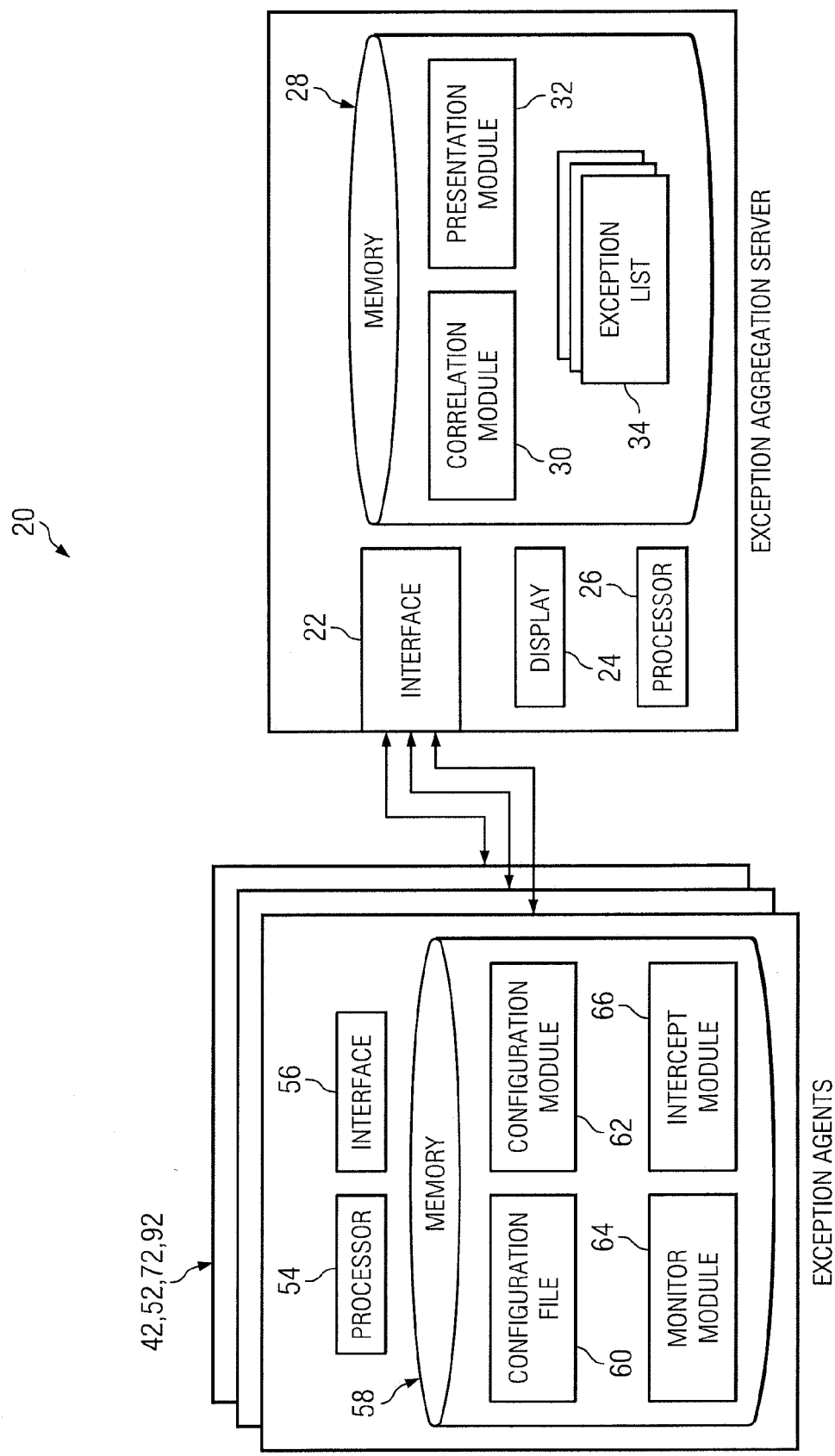
FIG. 2 is a block diagram illustrating example elements of exception agents and an exception aggregation server.

FIG. 2 is a block diagram illustrating example elements of infrastructure exception agent 52 and example elements of exception aggregation server 20. According to various embodiments, exception aggregation server 20 collects exceptions associated with service 40 for presentation to client 30. For example, exception aggregation server 20 may collect exceptions associated with services 40, infrastructure 50, applications 70, and storage 90 by receiving information from service exception agents 42, infrastructure exception agents 52, application exception agents 72, and/or storage exception agents 92 through communication network 100. Exception aggregation server 20 may analyze the information and present the information and/or an analysis to client 30. Exception aggregation server 20 may include an interface 22, a display 24, a processor 26, a memory 28, a correlation module 30, a presentation module 30, and exceptions lists 34.

Interface 22 represents any suitable collection of hardware, software, and controlling logic capable of communicating information to and receiving information from elements within communication network 100. For example, interface 22 may communicate through communication network 100 with various exception agents and client 30. As another example, interface 22 may receive exceptions and other information from service exception agents 42, infrastructure exception agents 52, application exception agents 72, and storage exception agents 92, and transmit exceptions and other information to client 30. Thus, interface 22 represents any suitable hardware or controlling logic used to communicate information to or from elements linked to exception aggregation server 20.

Display 24 represents any suitable collection of hardware, software, and controlling logic operable to present information to client 30. Display 24 may include a locally and/or remotely attached display device. Additionally or in the alternative, display 24 may include a web server capable of delivering web pages to client 30 through communication network 100.

Processor 26 represents any suitable collection of hardware, software, and controlling logic operable to control the operation and administration of elements within exception aggregation server 20. For example, processor 26 may operate to process information and/or commands received from interface 22 and memory 28. Processor 26 may operate to control and process information and may output display information to display 24. For example, processor 26 may be a microcontroller, processor, programmable logic device, and/or any other suitable processing device. In various embodiments, processor 26 may operate a web server that presents one or more web pages to client 30 through communication network 100.

Memory 28 represents any one or a combination of volatile or non-volatile local or remote devices suitable for storing information. For example, memory 28 may include random access memory (RAM), read only memory (ROM), magnetic storage devices, optical storage devices, or any other suitable information storage device or combination of these devices. Thus, memory 28 stores, either permanently or temporarily, data and other information, such as information for processing by processor 26 and transmission by interface 22. Memory 28 may store information in one or more modules. For example, in the embodiment illustrated memory 28 stores correlation module 30, presentation module 32, and multiple exception lists 34. While memory 28 as illustrated includes particular data elements, it should be understood that memory 28 may store any suitable information for use in operation of exception aggregation server 20.

Correlation module 30 represents software, executable files, web pages, and/or appropriate logic modules capable when executed to direct processor 26 to control of the operation exception aggregation server 20 to analyze information including exceptions. For example, correlation module 30 includes algorithms that correlate exceptions from service 40, infrastructure 50, applications 70, and storage 90 to identify one or more service error conditions.

Presentation module 32 represents software, executable files, Web pages, and/or appropriate logic modules capable when executed to direct processor 26 to control of the operation of exception aggregation server 20 to present information to client 30. For example, presentation module 32 may include logic operable to receive exceptions from exception agents 42, 52, 72, and 92 using interface 22. Presentation module may include logic operable to analyze exceptions by formatting and comparing exceptions for redundancies. Furthermore, presentation may include any collection of instructions capable of presenting exceptions and analysis to client 30 through communications network 100 using a selected presentation method.

Exceptions lists 34 represent information related to exceptions received from interface 22 through communication network 100. In various embodiments, exceptions lists 34 may represent multiple exceptions lists, each list storing exceptions and other information associated with a specific client. For example, each of exceptions lists 34 may individually relate to client-specific exceptions based on a selection of infrastructure 50, applications 70, and storage 90 associated with that client through service 40. Exceptions lists 34 may include information stored by presentation module 32 and/or correlation module 30. In various embodiments, exceptions lists 34 are formatted and stored by presentation module 32.

In operation, exception aggregation server 20 collects exceptions associated with service 40 by receiving information on interface 22 from service exception agents 42, infrastructure exception agents 52, applications exception agents 72, and/or storage exception agents 92. Processor 26 may execute code in correlation module 30 and presentation module 32 in order to analyze the information and present the information and/or an analysis to client 30.

For example, presentation module 32 may direct processor 26 to analyze the information related to exceptions received on interface 22 in order to create and format exceptions lists 34. Exception lists may be created based on categories of exceptions, based on clients to whom the exceptions on the exceptions list relate, or based on any number of appropriate reasons such as the type of information the exceptions represent, the type of cloud service or element with which exceptions are associated, and/or the time that exceptions were received.

In various embodiments, instructions in presentation module 32 may direct processor 26 to analyze and/or normalize the information related to exceptions received on interface 22 in order to identify and remove redundancies. Thus, formatting an exceptions list may include analyzing exceptions information received for redundancies and omitting and/or removing redundancies from the exceptions list. Redundancies may be removed before or after the exceptions lists are formed. In various embodiments exceptions may be compared as they are received to an exceptions list to identify redundancies. In such embodiments, redundant exceptions may not be added to the exceptions lists. Redundancies may also include types of exceptions that are not selected for presentation to the client 30. This selection may be made based on input from client 30, which may provide information to exception aggregation server 20 through communication network 100 indicating the type of exceptions and type and/or priority of conditions selected for presentation.

Correlation module 30 may direct processor 26 to analyze the information related to exceptions received on interface 22 in order to correlate exceptions associated with service 40, infrastructure 50, applications 70, and storage 90 to identify one or more service error conditions. For example, a service condition may be determined based on comparing exceptions from independent hardware and/or software modules associated with applications 70, comparing exceptions from independent hardware and/or software modules associated with applications 70 to exceptions from independent hardware and/or software modules associated with infrastructure 50, and/or exceptions from independent hardware and/or software modules associated with infrastructure 50 to exceptions from independent hardware and/or software modules associated with storage 90. In various embodiments, identifying a service error condition may include identifying a future service error condition based on mining historic data. This future service error condition may indicate problems that are likely, probable, and/or certain to occur based on the current condition of the services. In various embodiments, future error conditions may be determined by comparing exceptions associated with the infrastructure 50, the applications 70, and the storage 90 to past server conditions stored in memory 28. In various embodiments, identifying a service error condition may include identifying one or more causes of the error condition of the service 40.

Instructions in correlation module 30 may direct processor 22 to initiate a remedial plan based on the error condition of the service 40. For example, a remedial plan may include fixing a component, restarting a service or process, reconfiguring certain elements of the various cloud-based service elements, and/or increasing or decreasing one or more metrics that govern the use of cloud-based services, such as utilization levels and capacity. Instructions in correlation module 30 may direct processor 22 to create one or more service condition identifiers based on the identified service error conditions. In various embodiments, service identifiers may be added to and/or stored in exceptions lists 34. In the alternative or in addition, service identifiers may be stored and presented by presentation module 32.

The correlation capability of various embodiments of exception aggregation server 20 may be further illustrated by way of the following example. This example, however, is for illustrative purposes only and is not intended to limit or define the present disclosure in any way. First, application exception agent 72 reports an exception associated with applications 70 that indicates an application is unavailable due to a failed HTTP service. Exception aggregation server 20 correlates this exception to other exceptions it has received, including one that indicates that the HTTP service is running in application 70, and another that indicates that a first switch in infrastructure 50 is down and a second switch has high network congestion. As a result of correlating these exceptions, exception aggregation server 20 is able to determine that the root cause of the unavailability of web-based application is due to the failure of the first switch in the infrastructure 50, and not due to the reported failure of the HTTP service nor the high congestion on the second switch, both of which were caused by the failure of the first switch.

In various embodiments, presentation module 32 code may direct processor 26 to format the exceptions lists 34 into a variety of presentation formats. Such formats may include one or more formats that may be used to present the exceptions lists and one or more service identifiers to client 30. In various embodiments presentation module 32 may format the exceptions received from interface 22 into a uniform format appropriate for storing multiple exceptions lists in memory 28. In other embodiments, processor 26 may execute code in presentation module 32 to format the exceptions into one of exceptions lists 34 based on one or more selected preferred method received from client 30 over communication network 100. For example, client 30 may specify one or more methods of presentation, such as RSS style feeds, emails, text messages, phone calls, web browser displays, pagers, and dashboard displays. Client 30 may select one method of presentation for regular reports of information and/or analysis, and a second method of presentation for high priority information and/or analysis, such as high priority service error conditions. Thus, if processor 26 determines that a high priority service error condition is not present within service 40, the first selected method may be used to format and present the information and/or analysis. This type of presentation may be based on a regular interval of time and/or amount of exceptions, and/or upon client 30 demand, which may including accessing a web page or obtaining information for a dashboard display. If a high priority service error condition exists, an appropriate presentation method may be selected such as the second method. Thus, in the case of high priority exceptions and/or service error conditions, processor 26 may present those exceptions to client 30 using interface 22 at or near the time they are identified. For example, client 30 may subscribe to an RSS feed for regular reports and may select a pager number that can receive high priority information. Any type of exception and/or condition, however, may be presented to client 30 at any time using any presentation method.

Presentation module 32 may direct processor 26 to store exceptions lists and other information in memory 28 in the selected preferred presentation format and/or in a uniform format. Processor 26 may store exceptions lists and other information in an appropriate storage resource such as a database, which may be associated with service 40. Service condition identifiers and other information may be stored separately in memory 28 and/or as added to exceptions lists 34. Formatted and/or unformatted exceptions lists may be stored. Processor 22 may store exceptions and/or service condition identifiers in a format suitable for presentation to client 30 according to a preferred method selected by client 30. Processor 22 may maintain a database of exceptions lists and/or service condition identifiers, indexed based on the one or more clients to whom the exceptions lists relate and/or the categorization information described above. Any number of standard database packages may be utilized, including those capable of using SQL.

Thus, exception aggregation server 20 collects and reports exceptions associated with service 40. In such a manner, clients may be assured of the status of their information technology services. Additionally, clients may be informed of error conditions at or near the time that the conditions occur. Additionally, clients may be informed of future error conditions that may occur on the service in the future. Additionally, the exceptions may be reported to the client in a convenient format and manner according to a preferred method of presentation selected by client 30.

Now turning to service exception agents 42, infrastructure exception agents 52, application exception agents 72, and storage exception agents 92, an exception agent such as infrastructure exception agent 52 collects exceptions from one or more hardware modules and/or software modules associated with infrastructure 50 and transmits information to exception aggregation server 20. As illustrated, infrastructure exception agent 52 may include a processor 54, an interface 56, memory 58, a configuration file 60, a configuration module 62, a monitor module 64, and an intercept module 66. While reference will be made to one of infrastructure exception agents 52, it should be understood that the following discussion similarly relates to various embodiments of service exception agents 42, application exception agents 72, and storage exception agents 92.

Processor 54 represents any suitable collection of hardware, software, and controlling logic capable of controlling the operation and administration of elements within infrastructure exception agent 52. Thus, processor 54 may include any appropriate hardware and/or logic elements operable to control and process information. For example, processor 54 may be one or more of a microcontroller, processor, programmable logic device, and/or any other suitable processing device.

Interface 56 represents any suitable collection of hardware, software, and controlling logic capable of communicating information to and receiving information from communication network 100. For example, interface 56 may communicate through communication network 100 to exception aggregation server 20 and one or more hardware modules and/or software modules associated with infrastructure 50. Alternatively or in addition, interface 56 may communicate exception information associated with infrastructure 50 to exception aggregation server 20. Thus, interface 56 represents any suitable hardware or controlling logic used to communicate information to or from elements linked to infrastructure exception agent 52.

Memory 58 represents any one or a combination of volatile or non-volatile local or remote devices suitable for storing information. For example, memory 58 may include random access memory (RAM), read only memory (ROM), magnetic storage devices, optical storage devices, or any other suitable information storage device or combination of these devices. Thus, memory 58 stores, either permanently or temporarily, data and other information, such as information for processing by processor 54 and transmission by interface 56. Memory 58 may store information in one or more modules. For example, in the embodiment illustrated memory 58 stores configuration file 60, configuration module 62, monitor module 64, and intercept module 66. While memory 58 as illustrated includes particular data elements, it should be understood that memory 58 may store any suitable information for use in operation of infrastructure exception agent 52.

Configuration file 60 represents information related to configuring the operation of infrastructure exception agent 52 and/or other exception agents. For example, configuration file 60 may include the identify of one or more sources of exceptions, the identity of one or more exception aggregation servers, and/or information related to modes of operation of infrastructure exception agent 52 and/or other exception agents.

Configuration module 62 represents software, executable files, web pages, and/or appropriate logic modules capable when executed to configure the operation of infrastructure exception agent 52 and/or various other exception agents. For example, configuration module 62 includes algorithms appropriate to obtain configuration information and/or configure infrastructure exception agent 52 to operate in one or more collection modes, such as a monitor mode and/or an intercept mode.

Monitor module 64 represents software, executable files, web pages and appropriate logic modules capable when executed to control the operation of infrastructure exception agent 52 and/or various other exception agents. For example, monitor module 64 may include algorithms appropriate to direct infrastructure exception agent 52 to collect exceptions associated with infrastructure 50 in monitor mode and transmit exception information to exception aggregation server 20 using interface 56.

Intercept module 66 represents software, executable files, web pages and/or appropriate logic modules capable when executed to control the operation of infrastructure exception agent 52 and/or various other exception agents. For example, intercept module 66 may include algorithms appropriate to direct infrastructure exception agent 52 to collect exceptions associated with infrastructure 50 in intercept mode and transmit exception information to exception aggregation server 20 using interface 56.

In operation, infrastructure exception agent 52 collects exceptions from an identified source of exceptions, such as a hardware or software module associated with infrastructure 50, and transmits information to exception aggregation server 20 using interface 56. In various embodiments, processor 54 executes instructions found in configuration module 62, monitor module 64, and intercept module 66, thereby controlling the operation of infrastructure exception agent 52.

Configuration module 62 may direct processor 54 to read configuration file 60 in order to configure the operation of infrastructure exception agent 52. Additionally or alternatively, processor 54 executes instructions found in monitor module 60 to collect exceptions in monitor mode using interface 56, and report information relating to exceptions through communication network 100 to exception aggregation server 20 using interface 56. In various embodiments, processor 54 executes instructions in intercept module 66 to collect exceptions in intercept mode using interface 56 and report exceptions through communication network 100 to exception aggregation server 20 using interface 56. Infrastructure exception agent 52 may thus collect exceptions associated with identified exception sources associated with infrastructure 50 and transmit information to exception aggregation server 20.

Configuration module 62 may direct processor 54 to read configuration information included in configuration file 60 and/or to configure infrastructure exception agent 52. Thus, processor 54 may read configuration file 60 to determine and identify one or more sources of exceptions associated with the service 40, infrastructure 50, the application 70, and/or the storage 90. For example, a source of exceptions may be a hardware or software module associated with infrastructure 50. Additionally, or in the alternative, processor 54 may read information associated with configuration file 60 to determine the location of exception aggregation server 20 on communication network 100.

Configuration module 62 may direct processor 54 to configure infrastructure exception agent 52 to operate in monitor mode or an intercept mode. Configuration module 62 may additionally or alternatively include code to set an exception agent to operate in continuous mode, in which that exception agent may continuously collect and report exceptions associated with information technology services. In various embodiments the mode of operation may depend on the identified exception source. In various embodiments, processor 54 may receive configuration data from interface 56 through communication network 100 data from a client 30 and/or exception aggregation server 20 and store that configuration data into the configuration file 60. In the alternative or in addition, processor 54 may receive a configuration file 60 through communication network 100 from exception aggregation server 20 and/or client 30 and store configuration file 60 in memory 58.

In various embodiments, configuration module 62 direct processor 54 to configure exception agents to filter undesired exceptions. As an example, filter rules may govern the collection of exceptions such that include all, some, or one of fatal errors, status updates, warnings, and other appropriate information are collected and reported. Configuration module 62 may include instructions for processor 54 to configure exception agents to collect exceptions for a predetermined amount of time and/or predetermined amount of exceptions before reporting the exceptions to exception aggregation server 20. Thus, processor 54 executes configuration module 62 to configure infrastructure exception agent 52 to report and collect exceptions associated with information technology services.

Processor 54 executes instructions in monitor module 64 to operate infrastructure exception agent 52 in monitor mode and/or as configured by configuration module 62. For example, monitor mode may include identifying and analyzing a log file located at a source of exceptions associated with infrastructure 50. Alternatively or in addition, exceptions may be collected from one or more of service 40, application 70, or storage 90. Processor 54 identifies exceptions, identifies exception aggregation server 20, and reports identified exceptions to the identified exception aggregation server 20 using interface 56 through communication network 100.

Processor 54 executes instructions in intercept module 66 to operate infrastructure exception agent 52 in intercept mode and/or as configured by configuration module 62. For example, intercept mode may include identifying from configuration file 60 one or more sources of exceptions associated with service 40, infrastructure 50, application 70, and/or or storage 90. Processor 54, as directed by intercept module 66, may monitor or listen to the identified exception source for an exception transmission and intercept that transmission. Processor 54 may identify an exception aggregation server from configuration file 60 and transmit that exception to exception aggregation server 20.

In various embodiments, monitor module 64 and intercept module 66 direct processor 54 to collect exceptions in a variety of native formats that are associated with the identified sources of exceptions, which may include independent hardware and software modules. In the alternative or in addition, instructions in monitor module 64 and intercept module 66 direct processor 54 to translate the native format into a standard format before reporting the exception to exception aggregation server 20. Processor 54 may collect multiple exceptions and store information related to the exceptions in memory 58. Processor 54 may then transmit the stored exceptions to exception aggregation server 20 using interface 56 based on the occurrence of a condition such as the collection of a predetermined number of exceptions and/or a collection period consisting of a predetermined amount of time.

In various embodiments, instructions in monitor module 64 and intercept module 66 direct processor 54 to filter exceptions. For example, monitor module 64 and intercept module 66 may be configured by configuration module 62 to direct processor 54 to collect and/or report exceptions of one or more types such as warnings, errors, fatal exceptions, and/or status reports. In various embodiments, monitor module 64 and intercept module 66 may direct processor 54 to identify one or more clients associated with exception information and transmit information relating to an exception and a client identifier to exception aggregation server 20 using interface 56. In various embodiments, exception aggregation server 20 may perform various of these functions.

Thus, infrastructure exception agent 52 is able to collect exceptions from identified exception sources associated with infrastructure 50 and transmit information to exception aggregation server 20 over network 100. Similarly, service exception agents 42, application exception agents 72, and storage exception agents 92 are able to collect exceptions from identified exception sources respectively associated with service 40, applications 70, and storage 90 and transmit information to exception aggregation server 20 over network 100. Thus, transparency and assurance may be provided to clients by providing clients with information regarding the status of their information technology services. In the alternative or in addition, warnings and problems associated with information technology services may be detected in a timely and efficient manner.

Figure 3:
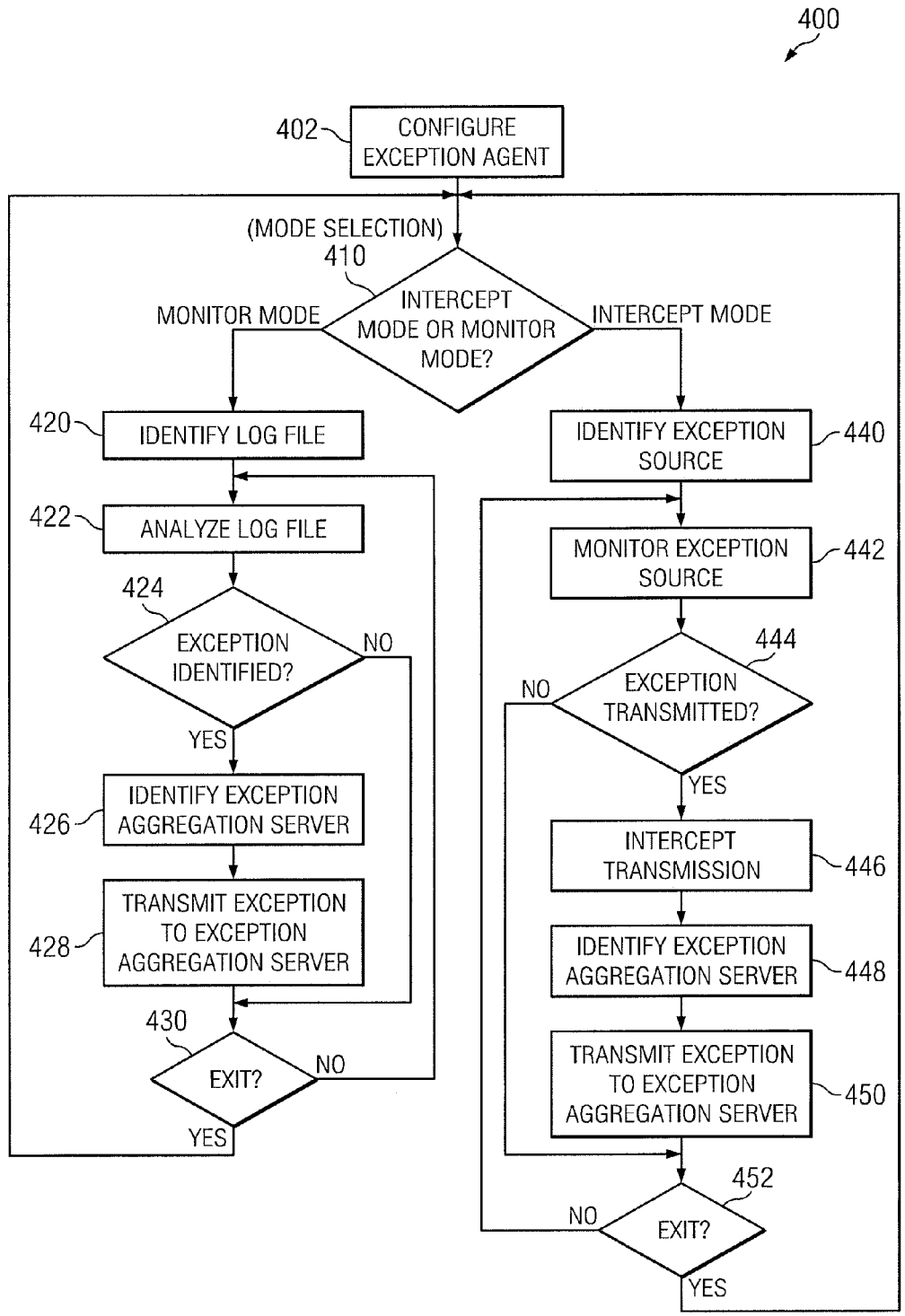
FIG. 3 is a flowchart illustrating an example method used to collect and report exceptions associated with information technology services.

FIG. 3 illustrates a method 400 for collecting and reporting exceptions associated with information technology services. One or more exception agents are configured at step 402. Configuration step 402 may include creating and/or analyzing a configuration file. For example, a configuration file may include information such as an identity of one or more sources of exceptions, an identity of one or more exception aggregation servers, an identity of types of exceptions to collect, an identity of one or more clients to whom sources of exceptions relate, an identity of mode of operation, and/or other appropriate information.

A determination is made at step 410 whether the exception agent will operate in intercept mode or monitor mode. In various embodiments, the mode of operation of the exception agent may be determined based on a source of exceptions and/or based on a configuration file. If step 410 sets the exception agent to operate in monitor mode, a log file is identified at step 420. This log file may be associated with one or more resources associated with the service 40, infrastructure 50, application 70, or storage 90 associated with the exception agent. This log file may include various information, including exceptions. In various embodiments, the log file may be stored in a memory associated with an element and/or resource. Alternatively or in addition, the log file may be stored in an appropriate storage resource such as a database associated the exception source.

While operating in monitor mode, the identified log file is analyzed at step 422. For example, the exception agent may analyze the log file to look for the types of exceptions to collect based on the configuration file created at step 402. A determination is made whether an appropriate exception has been identified within the log file at step 424. If an appropriate exception has been identified, the exception agent proceeds to identify an exception aggregation server at step 426. The identification of exceptions may be based on configuration information stored in the configuration file created at step 402. In various embodiments, the exception agent may collect multiple exceptions.

The appropriate exception is transmitted to the identified exception aggregation server at step 428. For example, the exception agent transmits the exception to the identified exception aggregation server through communication network 100. Step 428 may also include formatting the exception from its native format as produced by an element associated with information technology services to a standard format before transmitting it across the network to an exception aggregation server, such as exception aggregation server 20.

If an exception has not been identified in step 424, or if an appropriate exception has been transmitted at step 428, method 400 continues to step 430. A determination is made at step 430 whether to exit or to continue looking for exceptions within the identified log file. This determination may be made based on one or more of various factors, including determining that a continuous mode of operation is configured, receiving a stop or exit command, and/or reaching the end of the log file. If the exception agent makes the determination to continue, the process will return to step 422 and continue analyzing the identified log file. If a determination is made to exit at step 430, however, method 400 returns to step 410. Method 400 may include waiting a certain amount of time before proceeding to step 410 and may additionally or alternatively include identifying newly identified sources from which to collect exceptions before proceeding to step 410.

If step 410 sets the exception agent to operate in intercept mode, an exception source is identified at step 440. For example, an exception source may be identified based on the configuration file created at step 402 The identified exception source is monitored at step 442. For example, the exception agent may: listen for exceptions generated over a network, such as communication network 100, listen for exceptions or interrupts on a service or process, and/or monitor a communication related to an element and/or resource. A determination is made whether an exception has been transmitted from the identified exception source at step 444. In various embodiments, the exception agent may collect multiple exceptions.

If an exception has been transmitted at step 444, the transmission is intercepted at step 446. Once the exception transmission has been intercepted, an exception aggregation server is identified at step 448. This identification may be based on configuration information stored in the configuration file created at step 402.

An exception is transmitted to the identified exception aggregation server at step 450. For example, an exception agent may transmit information to the identified exception aggregation server through communication network 100. Step 450 may also include formatting the exception from its native format to a standard format before transmitting it across the network to an exception aggregation server, such as exception aggregation server 20.

If an exception has not been identified at step 444, or if an identified exception has been transmitted at step 450, method 400 continues to step 452. A determination is made at step 452 whether to exit or to continue monitoring the exception source. This determination may be made based on one or more of various factors, including determining that a continuous mode of operation is configured, receiving a stop or exit command, and/or other appropriate factors. If the exception agent makes the determination to continue, the process will return to step 442 and continue monitoring the exception source. If a determination is made to exit, however, the process returns to step 410. The process may include waiting a certain amount of time before proceeding to step 410 and may also include identifying any newly identified sources from which to collect exceptions.

Thus, method 400 illustrates one manner of collecting and reporting exceptions associated with information technology services. Method 400 may provide transparency and assurance to clients of the status of their information technology services. Additionally, method 400 may facilitate the dissemination of service information to a client at or near the time that events occur within the information technology services. Furthermore, method 400 may provide for the early detection of warnings and problems associated with information technology services. Another benefit of method 400 may include the ability to proactively obtain information about information technology services and initiate a remedial plan based on the identification of an error condition.

Figure 4:
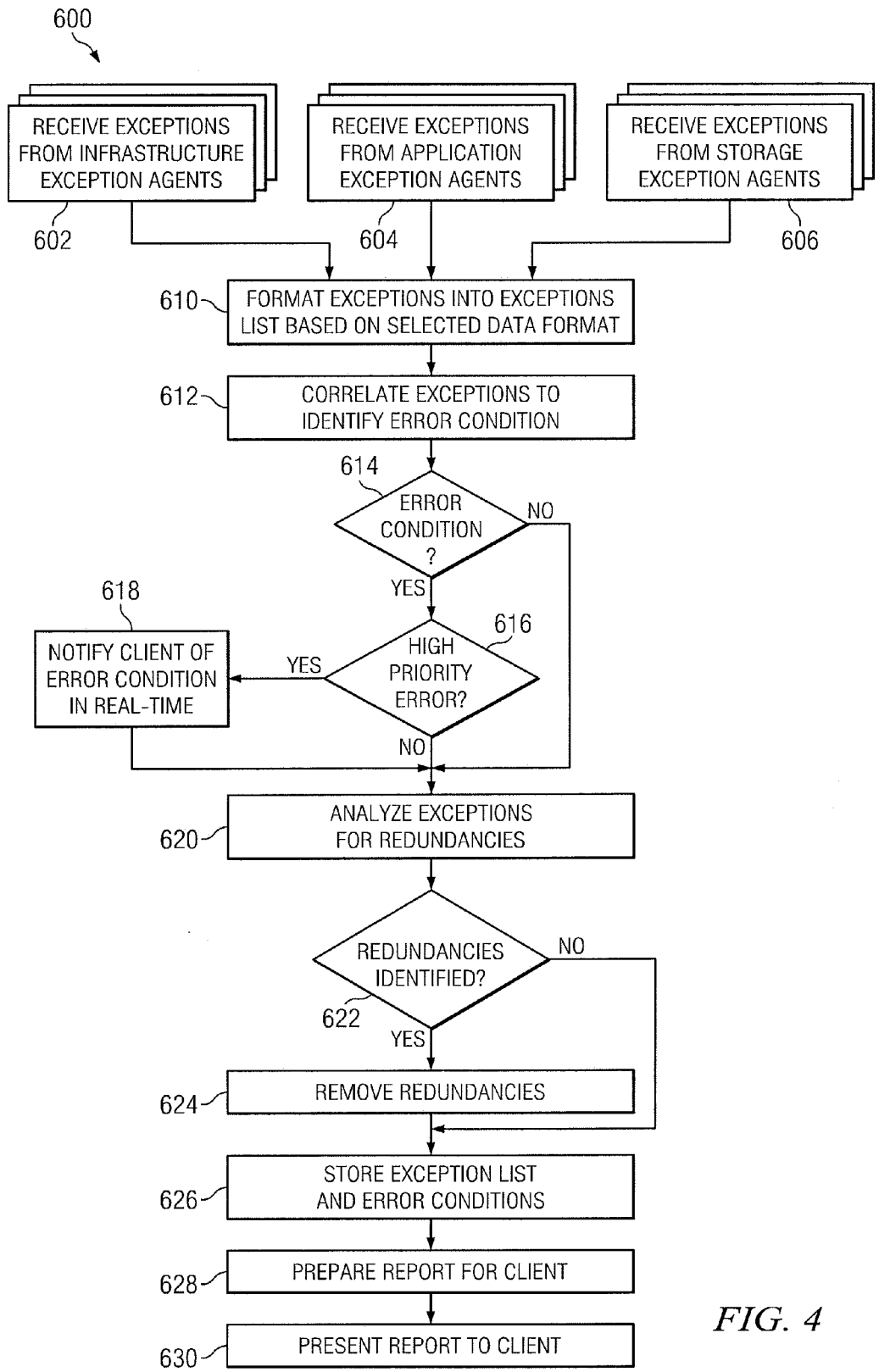
FIG. 4 is a flowchart illustrating another example of a method used to collect and report exceptions associated with information technology services.

FIG. 4 illustrates a method 600 to collect and report exceptions associated with information technology services. Exceptions are collected from the various exception agents at steps 602, 604, and 606. For example, exceptions associated with infrastructure 50 are received from infrastructure exception agents 52 at step 602. Exceptions associated with applications 70 are received from application exception agents 72 at step 604. Exceptions associated with a storage 90 are received from storage exception agents 92 at step 606.

The received exceptions are formatted into an exceptions list at step 610. Formatting may be based on a standard format suitable for storage and/or may be based on one of a variety of formats suitable for presentation to a client. The collected exceptions are correlated to identify an error condition of the service 40 at step 612. For example, various exceptions may be associated with a present or future error condition. A determination is made whether an error condition on the service 40 exists at step 614. If an error condition exists, a determination is made at step 616 as to the priority of the error condition. If the error condition has a high priority, client 30 may be notified of the error condition at or near real time at step 618. For example, service 40 operators or other service personnel capable of making adjustments or repairs to the service may be notified at step 618.

If an error condition was not identified at step 614, if the error condition was not identified as a high priority error condition at step 616, or after a client has been notified at step 618, method 400 proceeds to step 620. Exceptions are analyzed for redundancies at step 620. If redundancies are identified at step 622, they are removed at step 624.

If redundancies are not identified at step 622, or after the removal of redundancies at step 624, the formatted exception list and any identified error conditions are stored at step 626. For example, service error condition identifiers may be created based on service error conditions.

A report is prepared for a client at step 628. The report may consist of a formatted exceptions list and service condition identifiers. The report may include types of exceptions and types of error conditions client 30 has selected to receive. Alternatively or in addition, this report may include client-specific exceptions and service condition identifiers. The report may be prepared for delivery to client based on any number of methods of presentation selected by client 30, including at least one of an RSS feed, an email, a text message, a telephone call, a web browser, a pager, and a dashboard display. For example, an exceptions list and an identifier of a service error condition that are associated with a high priority service error condition may presented via an email or a phone call. Any appropriate presentation format, however, may be utilized.

A report is presented to client at step 630. For example, a report may be presented according to the selected method of presentation, and may take place by transmitting the report through communication network 100. According to various embodiments, reports may be made at defined intervals and/or when certain service error conditions occur.

Thus, method 600 illustrates another example of reporting and collecting exceptions from information technology services. Method 600 may facilitate the dissemination of service information to a client at or near the time at which the condition is identified. Additionally, method 600 may provide for early detection of warnings and problems associated with information technology services. Method 600 may also proactively obtain information about the service 40 and initiate a remedial plan based on the identification of an error condition. Furthermore, method 600 may identify error conditions and/or predict future error conditions associated with the service 40. Method 600 may also enable client 30 to determine how well cloud-based services are meeting its information technology needs.

The preceding flowcharts illustrate particular methods used to report and collect exceptions associated with information technology services. However, these flowcharts illustrate only exemplary methods of operation, and system 10 contemplates individuals and/or devices using any suitable techniques, elements, and applications for performing these functions. Thus, many of the steps in the flowcharts may take place simultaneously and/or in difference orders than shown. In addition, methods may include additional steps or fewer steps, so long as the method remains appropriate. Moreover, one or more devices of system 10 may work independently and/or in conjunction with other elements of system 10 to collect and report exceptions associated with various services.

Although the present disclosure has been described in several embodiments, a myriad of changes and modifications may be suggested to one skilled in the art, and it is intended that the present disclosure encompass such changes and modifications as fall within the present appended claims.

What is claimed is:

1. A method for collecting and reporting exceptions associated with information technology services, comprising:
   receiving a plurality of exceptions associated with a service, wherein the plurality of exceptions includes a plurality of first exceptions associated with an infrastructure and a plurality of second exceptions associated with an application;
   formatting the plurality of exceptions into an exceptions list;
   correlating at least one of the plurality of first exceptions and at least one of the plurality of second exceptions to identify a service error condition;
   storing the exceptions list and an identifier of the service error condition on a computer-readable medium;

intercepting a transmission of at least one of the plurality of exceptions associated with the service;

identifying an exception aggregation server associated with the intercepted exception; and transmitting the intercepted exception to the identified exception aggregation server.

2. The method of claim 1, further comprising:

analyzing a log file associated with the service to identify at least one of the plurality of exceptions associated with the service;

identifying an exception aggregation server associated with the identified exception; and transmitting the identified exception to the identified exception aggregation server.

3. The method of claim 1, wherein correlating at least one of the plurality of first exceptions and at least one of the plurality of second exceptions to identify a service error condition comprises:

comparing at least one of the plurality of first exceptions with at least one of the plurality of second exceptions; and identifying a present service error condition based on the comparison.

4. The method of claim 1, further comprising:

identifying at least one high priority exception among the plurality of exceptions; and notifying a client about the identified high priority exception.

5. The method of claim 1, further comprising:

receiving from a client a selection of a preferred method for presenting the exceptions list from a plurality of presentation options including at least one of an RSS feed, an email, a text message, a telephone call, a web browser, a pager, and a dashboard display; and presenting the exceptions list to the client according to the selected preferred method for presenting the exceptions list.

6. The method of claim 1, wherein the plurality of exceptions further comprises a plurality of third exceptions associated with a storage system.

7. The method of claim 1, further comprising:

identifying redundancies in the plurality of first exceptions and redundancies in the plurality of second exceptions; and removing at least a portion of the plurality of exceptions from the exceptions list based on the identified redundancies.

8. The method of claim 1, wherein the service comprises a premises-based service.

9. The method of claim 1, further comprising:

transmitting the exceptions list and an identifier of the service error condition to a client for presentation.

10. The method of claim 1, wherein:

the plurality of exceptions are associated with a cloud-based service, the cloud-based service operable to deliver an infrastructure and a business software application as a packaged service to a client and operable to track utilization by the client of the packaged service according to a metric;

the indentified service error edition is of the packaged service delivered by the cloud-based service; and the method further comprises:

determining, based at least in part upon the identified service error condition of the packaged service delivered by the cloud-based service, to increase or decrease one or more metrics governing the utilization of the packaged service by the client.

11. The method of claim 10, wherein the one or more metrics include one or more of a utilization level of the packaged service by the client and a capacity level of the packaged service by the client.

12. A system for collecting and reporting exceptions associated with information technology services, comprising:

an interface operable to receive a plurality of exceptions associated with a service, wherein the plurality of exceptions includes a plurality of first exceptions associated with an infrastructure and a plurality of second exceptions associated with an application; and a processor operable to:

format the plurality of exceptions into an exceptions list;

correlate at least one of the plurality of first exceptions and at least one of the plurality of second exceptions to identify a service error condition; and store the exceptions list and an identifier of the service error condition on a computer-readable medium;

a second processor operable to intercept a transmission of at least one of the plurality of exceptions associated with the service and operable to identify an exception aggregation server associated with the intercepted exception; and a second interface operable to transmit the intercepted exception to the identified exception aggregation server.

13. The system of claim 12, wherein:

a third processor operable to analyze a log file associated with the service to identify at least one of the plurality of exceptions associated with the service and further operable to identify an exception aggregation server associated with the identified exception; and a third interface operable to transmit the identified exception to the identified exception aggregation server.

14. The system of claim 12, wherein the processor is further operable to:

compare at least one of the plurality of first exceptions with at least one of the plurality of second exceptions; and identify a present service error condition based on the comparison.

15. The system of claim 12, wherein:

the processor is further operable to identify at least one high priority exception among the plurality of exceptions; and the interface is further operable to notify a client associated with the service about the identified high priority exception.

16. The system of claim 12, wherein the interface is further operable to:

receive from a client a selection of a preferred method for presenting the exceptions list from a plurality of presentation options including at least one of an RSS feed, an email, a text message, a telephone call, a web browser, a pager, and a dashboard display; and present the exceptions list to the client according to the selected preferred method for presenting the exceptions list.

17. The system of claim 12, wherein the plurality of exceptions further comprises a plurality of third exceptions associated with a storage system.

18. The system of claim 12, wherein the processor is further operable to:

identify redundancies in the plurality of first exceptions and redundancies in the plurality of second exceptions; and remove at least a portion of the plurality of exceptions from the exceptions list based on the identified redundancies.

19. The system of claim 12, wherein the service comprises a premises-based service.

20. The system of claim 12, the processor further operable to:
    transmit the exceptions list and an identifier of the service error condition to a client for presentation.

21. Instructions for collecting and reporting exceptions associated with information technology services, the instructions stored on a computer-readable medium and operable when executed by a processor to:
    receive a plurality of exceptions associated with a service, wherein the plurality of exceptions includes a plurality of first exceptions associated with an infrastructure and a plurality of second exceptions associated with an application;
    format the plurality of exceptions into an exceptions list;
    correlate at least one of the plurality of first exceptions and at least one of the plurality of second exceptions to identify a service error condition;
    store the exceptions list and an identifier of the service error condition on a computer-readable medium;
    intercept a transmission of at least one of the plurality of exceptions associated with the service;
    identify an exception aggregation server associated with the intercepted exception; and
    transmit the intercepted exception to the identified exception aggregation server.

22. The instructions of claim 21, further operable when executed by the processor to:
    analyze a log file associated with the service to identify at least one of the plurality of exceptions associated with the service;
    identify an exception aggregation server associated with the identified exception; and
    transmit the identified exception to the identified exception aggregation server.

23. The instructions of claim 21, wherein the logic is further operable when executed by the processor to:
    compare at least one of the plurality of first exceptions with at least one of the plurality of second exceptions; and
    identify a present service error condition based on the comparison.

24. The instructions of claim 21, the processor further operable to:
    transmit the exceptions list and an identifier of the service error condition to a client for presentation.

* * * * *